Oct. 22, 1963     F. HAUPTMAN     3,108,276
AIRCRAFT RUNWAY POSITION INDICATOR
Filed Dec. 15, 1960
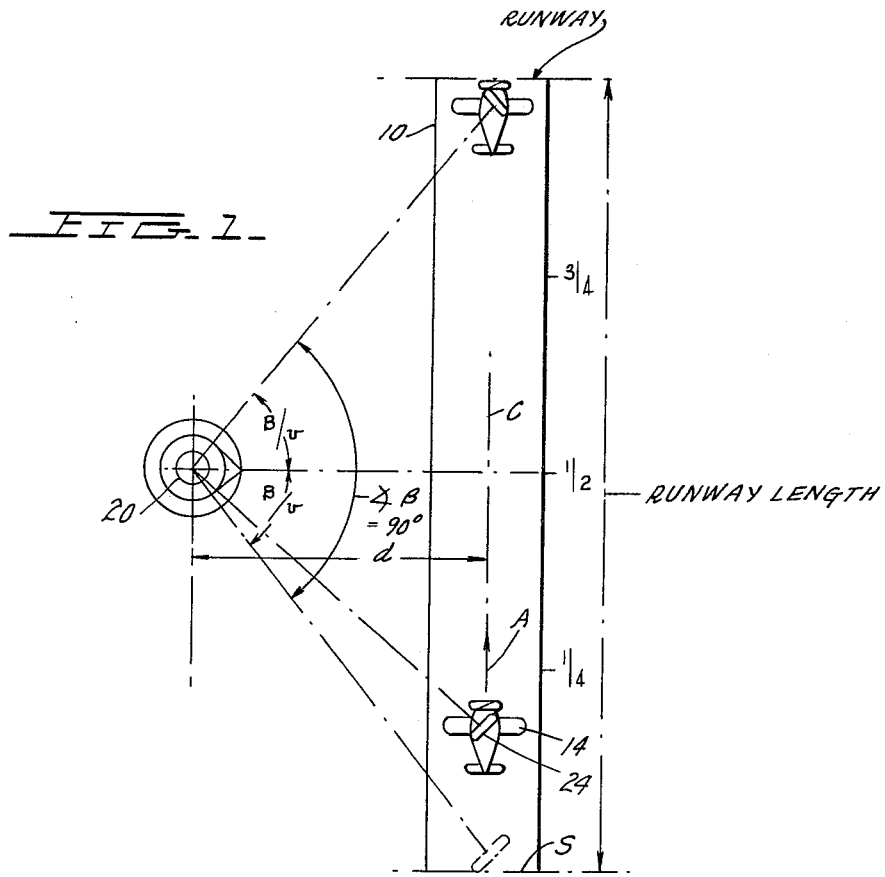
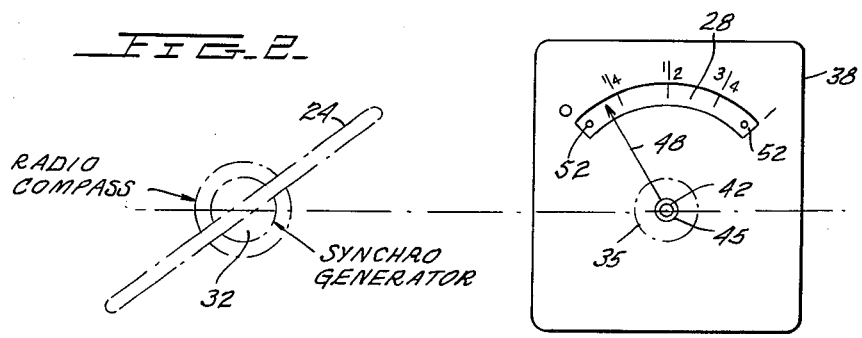
INVENTOR.
FREDERIC HAUPTMAN
BY
OSTROLENK, FABER, GERB & SOFFEN
ATTORNEYS

United States Patent Office 3,108,276
Patented Oct. 22, 1963

3,108,276
AIRCRAFT RUNWAY POSITION INDICATOR
Frederic Hauptman, Forest Hills, N.Y., assignor to Kollsman Instrument Corporation, Elmhurst, N.Y., a corporation of New York
Filed Dec. 15, 1960, Ser. No. 76,012
2 Claims. (Cl. 343—112)

This invention relates to aircraft take-off position indicating systems and more particularly to automatic systems.

The prior art mode of apprising pilots of their position along the length of a runway in taking off has been to position so-called billboards at various points along the length of the runway. Such billboards carry designations thereon corresponding to their positions so that a pilot, looking through a side window, may note the plane's position on the runway at certain points while his plane is gathering take-off speed. By comparing the plane position with the indicated air speed, he can check as to whether or not his speed is proper, that is, fast enough at the various points of runway travel so that he may be assured of being airborne by the time he reaches the end of the runway. If, for instance, the air speed indication is not high enough at some particular point of the runway, as indicated by the billboard thereat, the pilot is made aware of the probability that take-off will not be successful at the end of the runway and, accordingly, he will not complete his take-off run. Of course, a pilot must judge well in advance of the end of the runway whether or not to attempt to complete the take-off.

A serious drawback in connection with prior art systems, as above described, resides in the fact that the pilot must necessarily draw his attention away from the instrument panel in order to look out of the cockpit window to view the billboards during the course of take-off. There is also another drawback, in that accidents have occurred due to incorrect positioning of the billboards, incorrect markings, etc. A further drawback in connection with the use of billboards is the fact that if they are not properly placed, that is, if they protrude too far toward the runway, there is danger of collision. On the other hand, if they are made flush with the runway they are easily obscured by snow, ice, or mud.

It is the object of the present invention to overcome these drawbacks in providing a system which operates automatically by means of instrumentation to apprise a pilot of the position of his plane on the runway during take-off.

It is a further object of the invention to provide a system which may be readily assembled from conventional and commercial obtainable components, for the most part.

Briefly, my invention comprises the use of the usual radio compass normally found in aircraft, wherein such compass, of conventional construction and arrangement, such as having a rotative loop or core which automatically rotates to position itself for maximum signal (or minimum) with respect to a fixed ground signal. Thus, by providing a suitable transmitter of conventional type at a point along the length of the runway, and at the side thereof at a suitable distance therefrom, the radio compass loop of the plane, that is the antenna thereof, automatically rotates as the plane moves on take-off so as to maintain a maximum or minimum signal strength depending upon the type of system used. By arranging a synchro transmitter for rotation by the radio loop of the radio compass and a synchro motor coupled to the synchro transmitter, it will be apparent that such motor will rotate to the same degree as the radio loop. Accordingly, by arranging the synchro motor to actuate an indicator needle coacting with a scale calibrated to read portions of runway distance commensurate with angular turn of the radio compass, the pilot is apprised of his runway position by simply looking at his instrument board and the particular instrument in question. Thus, by comparison of the needle position of such instrument with his air speed indicator, he can judge in the usual manner whether or not his plane is proceeding at a safely high speed for take-off purposes from point to point of the runway.

A detailed description of the invention will now be given in conjunction with the appended drawing, in which:

FIGURE 1 is a diagrammatic plan view of a runway having a plane proceeding on take-off, showing the transmitter and the radio loop arrangement; and FIGURE 2 is a generally diagrammatic presentation of the synchro arrangement in conjunction with the radio loop and indicator means.

Referring now to FIGURE 1, a runway 10 is generally disclosed on which an aircraft 14 will be assumed to be proceeding on take-off in the direction of the arrow A. It will be noted that the runway is marked off in fractions of its length, e.g., in quarters. A radio transmitter 20 is located preferably on a line with the middle distance of the runway and at a particular distance $d$ from the center line C of the runway. The plane carries a radio loop 24 and it will be understood that as the plane moves from the starting position S in the direction of the arrow A the loop, in accordance with usual function, will automatically rotate so as to effect relative tracking with respect to the signal from transmitter 20. Thus, the several angular positions of the radio loop 24 are shown for corresponding plane positions starting with the initial position showing the loop in dot-dash lines.

The particular position of the transmitter with respect to the runway need not be essentially as shown and described, but such positioning is preferred for the purpose of maintaining the same indicator scale length on an instrument scale 28, as shown in FIGURE 2, which scale is calibrated in runway quarters corresponding to the runway quarter designations of FIGURE 1. Thus, in order to maintain such uniformity of scale, it is preferred that the transmitter be so located that the complete angle of transmission to the radio loop from beginning to end of the runway be 90 degrees. Inasmuch as at any point on the runway the remaining runway distance is a function of the angle B, such angle should be chosen so as to vary from zero to 45 degrees maximum for the first half run and from zero to minus 45 degrees maximum for the second half run. Thus, the full sweep of radio transmission for the run will be angle B, or 90 degrees. Further, the distance remaining to the end of the runway from any point at which the plane may be, will be equal to $$2d \tan \frac{B}{2}$$

the scale 28 is calibrated accordingly.

It should be noted that the particular geometry of the arrangement may be varied to suit various conditions, planes, and runways, but the basic principle, as described hereinabove, remains the same—mainly the calibration of scale 28 is correlated to runway length either in terms of distance traversed or distance remaining to be traversed.

Referring particularly to FIGURE 2, the principal components of the system will be noted as comprising a synchro generator 32 coupled to the radio loop 24 so as to be rotated thereby. The synchro generator is electrically connected in the usual manner to the synchro motor 35 which may be part of an instrument, generally designated by the cabinet or casing 38. Synchro motor 35 has a shaft 42 to which is secured preferably by a friction collar 45, or screw secured collar, an indicator needle 48, to indicate plane position on the scale 28. If desired, the scale may be a separable card element secured as by pins 52 so that respective scales may be used for specific runways and transmitter positions. It will, of course, be apparent that any mechanical arrangement may be utilized for affixing a selected scale to the panel of the instrument 38.

It may be desirable to incorporate the runway indicator with an air speed indicator in one and the same instrument. This can be done readily with existing commercial air speed indicators. The advantages of such a combination are obvious; namely, the fact that the pilot need only look at a single instrument having a dual needle arrangement, and also the fact that panel board space is saved. In connection with instrumentation, it will, of course, be understood that the scale calibration of the runway indicator need not be in fractions of the runway, but could be in any other unit, such as percent, or feet.

While the invention has been disclosed primarily as a take-off indicating device it could, as well, be used for a landing indicator device whereby a pilot would be apprised of his position on the runway after touch down and while taxiing. This, of course, would be particularly advantageous under conditions of poor visibility.

While the scale 28 has been shown of generally conventional, horizontally reading form, it will, of course, be understood that a vertically reading scale could be utilized as readily. Such vertical scale would give a more realistic presentation for a runway indicator. The needle actuator for such a scale would then have a reciprocal motion, preferably, rather than an arcuate motion, so that the needle would move upwardly linearly as the plane traversed the runway. Vertical scale instruments are, of course, well known and no specific construction need be shown herein. Alternatively, a drum scale, with the drum axis horizontal could be utilized.

Having thus described my invention, I am aware that various changes may be made without departing from the spirit thereof and, therefore, do not seek to be limited to the precise illustrations herein given, except as set forth in the appended claims.

I claim:

1. An aircraft runway position indicating system comprising a radio transmitter fixed at a predetermined position off the longitudinal axis of said runway, means comprising a radio compass to be carried by an aircraft and having a radio loop automatically and continuously positioned in response to the position of said aircraft relative to said transmitter as said aircraft moves with respect to said runway; and indicator means carried by said aircraft and actuated in response to movement of the radio loop to indicate the aircraft position on said runway; said position of said transmitter being such that the full arc of radio transmission for the length of said runway is 90 degrees.

2. In a system as set forth in claim 1, said indicator means comprising a synchro generator actuated by movement of said radio loop, a synchro motor connected to said generator and actuated in response to movement thereof, and an indicator device actuated by said synchro motor to indicate aircraft position.

References Cited in the file of this patent

UNITED STATES PATENTS 2,940,077     Garnier _____ June 7, 1960

FOREIGN PATENTS 884,196     France _____ Apr. 12, 1943